UNITED STATES PATENT OFFICE.

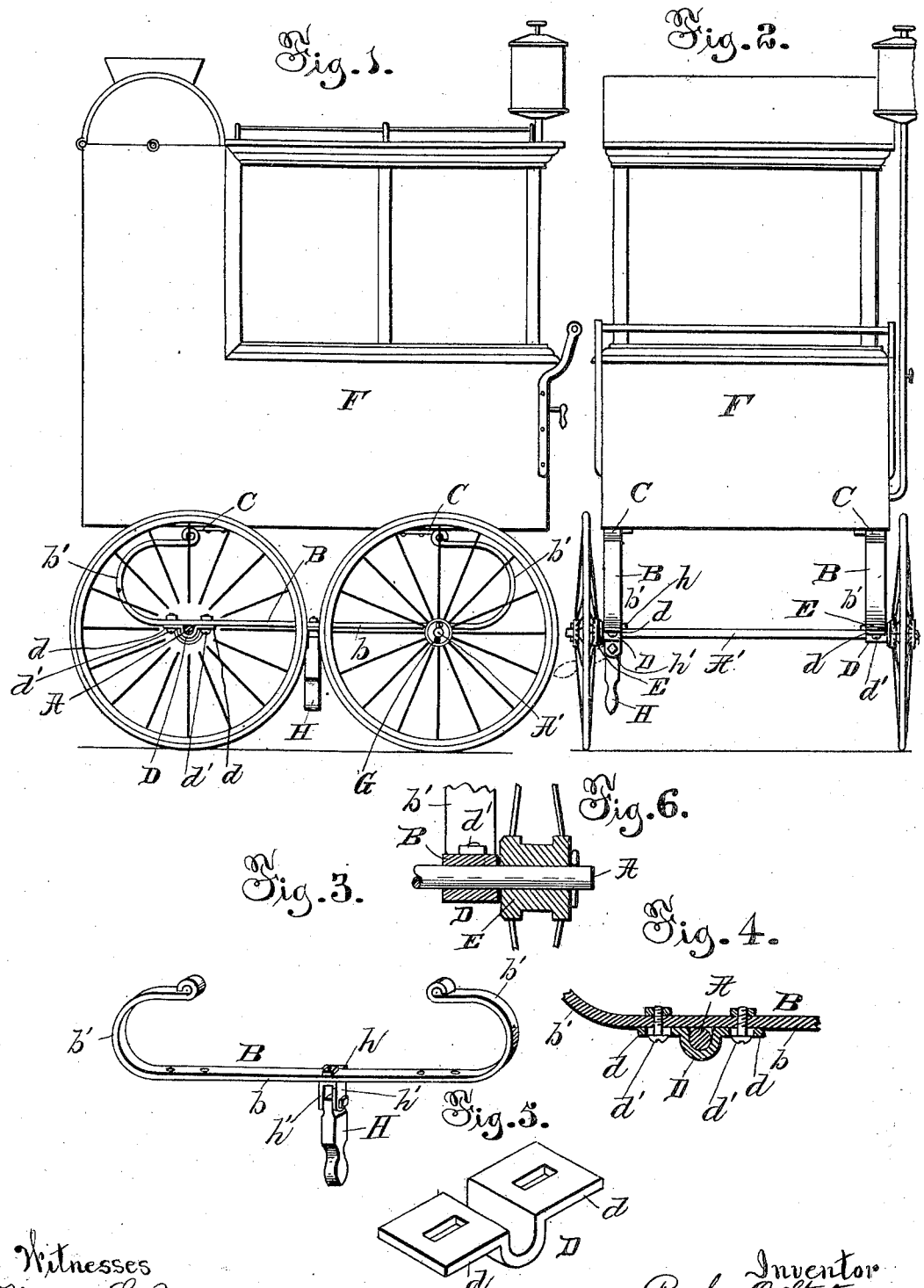

REUBEN O. STUTSMAN, OF DES MOINES, IOWA, ASSIGNOR TO THE BARTHOLOMEW COMPANY, OF PEORIA, ILLINOIS, A CORPORATION OF ILLINOIS.

CARRIAGE RUNNING-GEAR.

SPECIFICATION forming part of Letters Patent No. 688,895, dated December 17, 1901.

Application filed July 25, 1898. Serial No. 686,814. (No model.)

*To all whom it may concern:*

Be it known that I, REUBEN O. STUTSMAN, a citizen of the United States, residing at Des Moines, in the county of Polk and State of Iowa, have invented certain new and useful Improvements in Carriage Running-Gear; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a side elevation of a vehicle embodying my improvements. Fig. 2 is a front view of the same. Fig. 3 shows one of the springs detached. Fig. 4 is a cross-section of the axle at points adjacent to one of the springs. Fig. 5 is a perspective of the clamp which serves both to fasten the spring and to hold the wheel-hub. Fig. 6 is a sectional view of the hub and spring-support.

In the drawings I have illustrated more or less conventionally a vehicle of the sort used for supporting and transporting the parts of a corn-popper and peanut-roaster, the present invention being particularly well adapted for use in a mechanism of that sort. F indicates the body of such a vehicle, the several detail parts of which do not require description, being well known. This body is mounted upon two axles A A'. These are formed of shafting or round bar-iron in order that they may be cheaply produced. Being of this shape, they are ready to receive the wheels without expensive machine-work. Between the body and the axles there are interposed spring-bars B B, which, with the axles and wheels, constitute the entire running-gear. These springs are formed by bending a resilient bar so as to have the central bottom part $b$ extending from one axle to the other and to have at each end outside of the axle a U-shaped part $b'$, extending outward, upward, and inward. The inwardly-extending upper ends are firmly secured at C to the bottom of the body. The extreme ends of the U-shaped portions $b'$ of the side spring-bars are bent upward and outward to form upwardly-projecting transverse bearings $b^2$, disposed above the inward-extending portions of the spring, and the transverse pins or bolts, which pivotally unite the body to the springs, pass through such bearings $b^2$. The straighter bottom part $b$ is fastened to the axle by means of clips or clamps D, which are of the nature of boxing-caps, and have ears $d$ $d$, that can be drawn by bolts $d'$ tightly against the longitudinal part $b$ of the spring-bar. The clamps or clips D perform another function—that is to say, they serve as an abutment, against which the wheel-hubs E bear inward. By constructing and arranging the parts in this way I obviate the necessity of imparting to the axles any special shape or combining with them supplemental parts for the purpose of holding the wheel-hubs in proper place. Each hub is prevented from escaping outwardly by means of a cotter-pin G or otherwise.

By following the method of construction above described I can produce a cheap running-gear for vehicles of this sort, all of whose parts are sufficiently strong, but which can be readily and easily made. I dispense with the numerous parts commonly employed to constitute the running-gear and furnish a gear which is light and tasty in appearance and which shall provide sufficient resiliency for the proper carriage of the body.

H indicates a brake-block, preferably formed of wood, which can be utilized for locking the two wheels. It is situated between the wheels at their inner sides and is supported by one of the spring-bars B. It may be supported thereon in any suitable way, though for simplicity and cheapness I prefer to have it substantially rigid thereon. As shown, the brake H is carried by a support which is provided with an upwardly-extending ear or lug $h$, adapted to extend across the inner edge or side of the spring B, and with two depending lugs $h'$, between which the brake is pivoted. The brake-support is bolted securely to the spring B and when desired the brake can be turned about its pivot into the position indicated in dotted lines in Fig. 2. When in this position, it will be seen that the brake fits snugly between the two wheels and effectually locks them from rotation.

I am aware that brakes of various sorts have been combined with vehicles and arranged to engage with them at points where the wheels are adjacent to each other; but I believe myself to have devised a simpler and more reliable construction for this purpose than any with which I am acquainted. It will be seen that the brake-block is arranged to project downward from the spring and normally tends to drop and hang downward, in contrast with earlier constructions, in which the brake was above the central parts of the wheels and required levers and other devices for operating it and holding it in inactive position, and in the present case friction and pressure are depended on for effecting the locking, and immediately upon the release of the brake from such friction it drops to inactive position and will not accidentally reach its active position or interfere with the proper motion of the wheels.

What I claim is—

1. In a vehicle, the combination with the body, and the running-gear having two pairs of wheels the peripheries of which wheels on one side of the body are adjacent to each other, of a brake arranged to bear upon the two adjacent wheels simultaneously, it being pivoted to the running-gear at its upper end and arranged to be swung outward and upward to engage the wheel and tending normally to drop away from the wheel, substantially as set forth.

2. In a vehicle, the combination with the body, and the running-gear having two pairs of wheels the peripheries of which wheels on one side of the body are adjacent to each other, of a brake arranged to bear upon the two adjacent wheels simultaneously, and a support carried by the running-gear to which the upper end of the brake is pivoted, the pivotal connection of the brake with its support being inside the wheels with which the brake engages, and in a horizontal plane slightly below where the peripheries of the wheels most nearly approach each other, substantially as set forth.

3. In a vehicle of the class described, the combination with the body and the running-gear having the longitudinally-arranged spring-bars with their ends turned up and secured to the bottom of the body and secured to the axles respectively at points adjacent to the ends, the axles being otherwise disconnected, of the brake-block situated below one of the springs, the clip for the brake-block secured to the springs, the pivot for the brake at the upper end thereof, said brake being arranged to swing outward and upward to engage the peripheries of the two adjacent wheels, normally tending to drop away from them, substantially as set forth.

4. In a vehicle of the class described, the running-gear consisting of the combination of the front and rear axles, longitudinally-arranged side spring-bars having the longitudinal portions $b$ secured to said axles, each spring having its front and rear ends bent upward, inward and finally upward and outward to form transverse bearings above the upper inwardly-extending portions of the spring, transverse pins or bolts and means whereby said bolts are connected beneath and with the body of the vehicle to pivotally connect said body with said upwardly-projecting bearings, substantially as set forth.

5. In a vehicle of the class described, the combination with the body, of the wheels and axles, a longitudinal spring at each side of the body having its lower portion attached to said axles and having its forward and rear ends bent upward and inward beneath said body, means for attaching said ends of the springs to the body, and a pendent brake-block pivotally attached to said lower portion of one of said springs on an axis transverse to the wheel-axles and in a horizontal plane below the axles and adapted to be turned on said axis to a position between the front and rear wheels to engage and secure the same, substantially as set forth.

In testimony whereof I affix my signature in presence of two witnesses.

REUBEN O. STUTSMAN.

Witnesses:
S. W. LEONARD,
GEO. SHAW.